United States Patent [19]

Frencken

[11] Patent Number: 5,936,670
[45] Date of Patent: Aug. 10, 1999

[54] METHOD AND DEVICE FOR DECODING CODED DIGITAL VIDEO SIGNALS

[75] Inventor: Peter H. Frencken, Weert, Netherlands

[73] Assignee: U.S. Philips Corporation, New York, N.Y.

[21] Appl. No.: 08/836,790
[22] PCT Filed: Sep. 19, 1996
[86] PCT No.: PCT/IB96/00959
   § 371 Date: May 19, 1997
   § 102(e) Date: May 19, 1997
[87] PCT Pub. No.: WO97/11562
   PCT Pub. Date: Mar. 27, 1997

[30]  Foreign Application Priority Data

Sep. 20, 1995 [EP] European Pat. Off. ............. 95402121

[51] Int. Cl.⁶ ............................. H04N 7/12; H04N 11/02; H04N 11/04
[52] U.S. Cl. ......................... 348/413; 348/409; 348/416
[58] Field of Search ................................ 348/409, 412, 348/413, 415, 416; H04N 7/12, 11/02, 11/04

[56]  References Cited

U.S. PATENT DOCUMENTS

| 5,227,878 | 7/1993 | Puri et al. ............................... 348/416 |
| 5,294,974 | 3/1994 | Naimpally et al. . |
| 5,504,530 | 4/1996 | Obikane et al. ........................ 348/413 |
| 5,510,840 | 4/1996 | Yoneitsu et al. ........................ 348/402 |
| 5,574,504 | 11/1996 | Yagasaki et al. ....................... 348/415 |
| 5,576,765 | 11/1996 | Cheney et al. ........................... 348/407 |
| 5,576,767 | 11/1996 | Lee et al. ................................. 348/413 |

FOREIGN PATENT DOCUMENTS

| 0714208A2 | 5/1996 | European Pat. Off. ......... H04N 7/24 |
| 0732857A1 | 9/1996 | European Pat. Off. ......... H04N 7/50 |

OTHER PUBLICATIONS

VLSI Implementation of MPEG Decoders by Thierry Fautier; pp. 164–172, May 1994.

Primary Examiner—Tommy P. Chin
Assistant Examiner—Nhon Diep

[57]  ABSTRACT

Conventional MPEG decoders require about 16 Mbits of external memory to contain the input buffer, the two usual reference frames, and the B-information. As proposed earlier, about 2,8 Mbit in memory capacity can be saved by omitting the storage of B-information. The system, provides a further exchange between memory capacity and internal processing, to effect MPEG decoding, with only one reference frame stored in memory. All B and P information required for the reconstruction of display information which cannot directly be retrieved from memory is decoded instantaneously. Three decoding sub-steps are provided, a first decoding sub-step for the macroblock parameters, a second decoding sub-step for the picture elements according to a decoding-on-the-fly principle, and a third decoding sub-step for updating of the earlier reference frame after decoding of a later reference frame.

3 Claims, 5 Drawing Sheets

FIG. 12d (4) | P-2 | P-2 | P-2 | I1 | I1 | I1 | I1 | I1 | P4 | P4 | P4 | P4 | P4 | P7 | P7 | P7 | P7 | P7 |
FWP | FWP | FWP | FWP

METHOD AND DEVICE FOR DECODING CODED DIGITAL VIDEO SIGNALS

BACKGROUND OF THE INVENTION

1. Field of the Invention

The present invention relates to a method of decoding digital signals which correspond to images subdivided into fixed-size picture areas, called macroblocks, and have been transmitted and/or stored in the form of coded data corresponding to frames of I or P or B type. The I type being coded without using information from other frames, the P type being predicted by means of a motion-compensated prediction from an earlier reference frame and an associated motion information, and the B-type being bidirectionally interpolated from an earlier and a later reference frame of I or P type and associated motion information. Such decoding method includes for decoding of the macroblocks, the steps of:

storing the input bitstream of the coded macroblock data of I, P or B type, corresponding for each macroblock to its relevant parameters and the picture elements therein;

decoding said coded data according to their type; and displaying pictures reconstituted in accordance with the decoded data thus obtained.

The invention also relates to a decoding device for the implementation of this of decoding digital signals which correspond to images subdivided into fixed-size picture areas, called macroblocks, and have been transmitted and/or stored in the form of coded data corresponding either to frames of I or B type, the I type being coded without using any information from other frames the P type being predicted by means of a motion-compensated prediction from an earlier reference frame and an associated motion information, the B type being bidirectionally interpolated from an earlier and a later reference frame of I or P type and associated motion information, said decoding device comprising:

means for storing the input bitstream of the coded macroblock data of I, P, or B type;

means for decoding said coded macroblock data according to said type;

means for storing at least said earlier reference frame;

means for displaying after a format conversion the pictures reconstituted in accordance with the decoded data thus obtained;

bus means for the connections between said storing, decoding and displaying means.

Such an invention has an application in the field of digital television (either normal definition television or high definition television), and especially when television signals are compatible with the MPEG standard for digital moving picture decoding, the characteristics of which will not be described.

2. Description of the Related Art

The International Standardization Organisation (ISO) has developed over these last few years several digital data compression algorithms, and particularly the MPEG standard (MPEG, from Moving Picture Experts Group). This standard, provided for achieving compatibility between compression and decompression equipment and specifying both the coded digital representation of a video signal and the method of decoding, is based on two main techniques: an orthogonal transformation of the signals to be compressed, which allows to remove the spatial redundancy within each picture, and a motion compensation between pictures, which allows to remove the temporal redundancy in the sequence of pictures.

Motion compensation is a technique which consists in combining already coded pictures with data representative of the motion concerning these pictures. This technique, also called motion-compensated prediction, assumes that the current picture can be locally modeled as a translation of the picture at a previous time. The word "locally" means that the amplitude and the direction of the translation need not be the same everywhere in the picture. The pictures being subdivided into blocks, or into macroblocks including several blocks, the translation from one macroblock (for instance) of a previous picture to a corresponding macroblock of the current picture is described by a vector representative of the displacement between these macroblocks. The encoding process can then concern no longer the macroblock itself but an error macroblock obtained by subtraction between said previous and current macroblocks. An inverse decoding process allows to reconstruct the original pictures. Under the MPEG standard, the picture is divided into a series of slices, each of them containing a number of macroblocks. Each macroblock covers an area of 16×16 picture elements, or pixels, comprising itself four luminance blocks of 8×8 pixels and two chrominance blocks of 8×8 pixels, and the motion compensation is provided between the macroblocks of 16×16 pixels (by coding the motion of an entire macroblock by a motion vector rather than at the pixel level, an increased data compression is achieved).

Three types of pictures (designated "intra", "predicted", and "interpolated") are considered in the MPEG standard: I-type pictures, said intra pictures being coded without using any information from other pictures (these I pictures, least frequently provided, allow for instance random access to the sequence of coded pictures), P-type pictures, said predicted pictures being predicted by motion compensation from a previous I or P picture (only the incremental changes in pixel values from this last picture are coded), and B-type pictures, said interpolated pictures being obtained by a bidirectional motion-compensated interpolation from both an earlier and a later picture of I or P type.

The corresponding motion vector generation is the following. For the predicted pictures, one forward motion vector (making reference to a previous picture field) is calculated for each field macroblock and with respect to the preceding predicted or intra picture field of the same parity (i.e. the previous predicted odd, resp. even, picture field if the current picture field is odd, resp. even). For the bidirectionally interpolated pictures, forward and backwards motion vectors are calculated with respect to the preceding and the following predicted or intra picture field of the same parity (and practically a third displacement vector is often calculated with respect to the nearest predicted or intra picture field of the opposite parity).

U.S. Pat. No. 5,294,974 shows the structure of an encoding device provided for yielding a digital data stream with a syntax according to the MPEG standard, while a decoder provided for decoding such an MPEG digital data stream is described for example in the document ISCAS 94, London, May 1994, chap. 3.22, "VLSI implementation of MPEG decoders". The structure of a decoder as described in this document is shown in to FIG. 1. hereof Input coded signals are received by a decoding sub-assembly 10, the output signals of which correspond to the luminance (and the chrominance) of the pixels to be displayed. The sub-assembly 10, connected via a bus 30 to a storing sub-assembly 20, comprises a decoding device 11 and a display device 12. The decoded signals delivered by the decoding device 11 are stored in the storing sub-assembly 20 in the form of macroblocks of 16×16 pixels and according to the so-called 4:2:0 format. The stored macroblocks are then sent back towards the display device 12 which adapts them to the wanted output interlaced mode 4:2:2 (and also reconstitutes the lacking chrominance information).

FIG. 2 shows how the decoding device 11 functions according to the MPEG standard. The coded signals of the MPEG data stream are first stored in a buffer memory 110, in which the header of the picture sequence and of each group of pictures in this sequence will be read. The beginning of each picture and its type being identified, the decoding step of each macroblock is then implemented by a variable length decoding circuit 120. After an inverse quantization of each data block or macroblock followed by its inverse orthogonal transform (respectively in an inverse quantization circuit 130 and in a inverse discrete cosine transform circuit 140), a motion compensation circuit 150 receives the displacement vectors and the signals indicating the type of each macroblock (intra or inter, according to the coding mode) and yields the predicted macroblocks. Except with the intra mode, these macroblocks are then added to the decoded signals by an adder 160, the output of which delivers the signals that will be displayed in view of the reconstruction of the pictures. If these pictures are of I or P type, they are stored in reference memories since they will be useful for the reconstruction of B pictures. As the pictures had been transmitted and/or stored in a different order from the order in which they will be displayed (in view of this reconstruction of B pictures), these pictures must be reordered before they are displayed.

Most of MPEG decoders usually include an external memory of 16.8 Mbits (1 Mbit=$2^{20}$ bits). For picture sizes of for instance 720×576 pixels, this memory capacity is subdivided as indicated below:

(a) input buffer memory 110: about 2.5 Mbits;
(b) reference memories for the reference pictures (it has been already said that these previous and following pictures are necessary for the bidirectional interpolation of macroblocks of B pictures): 720×576×8×1.5 Mbits per picture, i.e. 5 Mbits;
(c) memory for each B picture: about 3.8 Mbits.

The global memory capacity thus has a value of 16.3 Mbits (2.5+2×5+3.8), and so only 500 kbits are therefore available for further applications (for instance additional functions like teletext, graphics, on-screen-display, and so on), which is not sufficient to implement them.

European patent application No. 94402708.5, first filed on, or based on a priority of, Nov. 25th, 1994, originating from the present applicant and not yet published, described a method of decoding MPEG signals that allows to correct this drawback and therefore to provide available memory capacity for such further applications. However, before this method is described, it is useful to recall in reference to FIGS. 3 to 9 the manner in which the buffer memory of an MPEG decoder is used.

FIG. 3 shows the input coded data stream of said decoder for a complete group of twelve pictures (GOP), said pictures being of I, P or B type (to use bidirectional prediction, the original order of the pictures, $B_{-1}$ $B_0$ $I_1$ $B_2$ $B_3$ $P_4$ $B_5$ $B_6$ $P_7$ $B_8$ $B_9$ $P_{10}$ $B_{11}$ $B_{12}$ has been modified and is become $I_1$ $B_{-1}$ $B_0$ $P_4$ $B_2$ $B_3$ $P_7$ $B_5$ $B_6$ $P_{10}$ $B_8$ $B_9$ $I_{13}$, . . . , and so on). These input data are delivered to the buffer memory 110, here of FIFO type (First-In, First-Out), and FIG. 4 shows the evolution of the storing step in this FIFO memory. When all data concerning a given picture are stored within this memory, the MPEG decoder can decode the picture (FIG. 5), according to the following time schedule:

(a) the intra picture $I_1$ is decoded and stored within the first reference memory (FIG. 6) as long as another picture is not ready to replace it (predicted picture $P_7$), i.e during six picture periods;
(b) during the two following picture periods, the coded pictures $B_{-1}$ and $B_0$, which follow the picture $I_1$, are bidirectionally interpolated and stored within the display memory (FIG. 8) in view of the display (FIG. 9) of each field (odd field+even field) of these pictures;
(c) as for the picture $I_1$, the predicted picture $P_4$ is similarly decoded and stored within the second reference memory (FIG. 7) as long as another picture is not ready to replace it (predicted picture $P_{10}$);
(d) the picture $I_1$ is displayed (odd and even fields);
(e) the coded pictures $B_2$ and $B_3$ are interpolated and stored within the display memory (FIG. 8) in view of the display (FIG. 9) of both fields of these pictures;
(f) the picture $P_4$ is displayed, . . . and so on: the decoding and display steps are carried out, in the transmission order for the decoding one and in the original order for the display one.

In comparison with such a conventional MPEG decoder, said European patent application has proposed to implement the decoding step of B pictures at the moment when decoded data corresponding to B pictures are requested in view of the display step, said B pictures being therefore decoded according to a "decoding-on-the-fly" principle (the corresponding decoded data are no longer stored within the display memory), and concerns to this end a method of decoding digital signals which correspond to images with interlaced fields and which, after a data compression based on a sequential coding of macroblocks partitioning said images and each including luminance and chrominance blocks, have been transmitted and/or stored in the form of coded data corresponding either to frames of I or B type, the I type being coded without using information from other picture frames, the P type being predicted by means of a motion-compensated prediction from an I-frame or another P-frame, the B-type being bidirectionally interpolated from previous and following frames of I or P tppe. This method uses a memory space in said external memory for storing the frames which have been or are being decoded and will then be displayed, and comprises, for the decoding step of at least luminance blocks of each macroblock of the B frames, two successive sub-steps:

(1) a first sub-step at nominal speed for decoding among the fully coded data corresponding to the macroblock only the relevant macroblock parameters, the obtained decoded data being then stored in a part called "auxiliary memory" of said external memory;
(2) a second sub-step for decoding among said fully coded data only data corresponding to the picture elements, said second sub-step being performed at the time decoded data are required at display side, according to said "decoding-on-the-fly" principle which excludes any storing step of the decoded data associated to the picture elements.

Since no orthogonal transform is involved in the first sub-step, its implementation is simpler than a conventional variable length decoding step and, since all relevant macroblock parameters can now be retrieved from the auxiliary memory, this allows to have a very fast second sub-step. Such a two step decoding approach allows saving of around 3 Mbits in memory capacity.

Although it would be very attractive to achieve a further reduction of such a memory capacity, it seemed that it would not be possible without affecting the memory bandwidth significantly.

SUMMARY OF THE INVENTION

It is an object of the present invention to provide however, a modification of the video decoding in order to effect a greater saving of memory capacity.

To this end, the invention relates to a method of decoding digital signals as defined in the preamble above and in which said decoding step comprises the following sub-steps:

(1) a first decoding sub-step for decoding among the coded macroblock data only the relevant macroblock parameters, the decoded signals thus obtained being stored as auxiliary data;

(2) a second decoding sub-step for decoding among said coded macroblock data only the data corresponding to the picture elements, said second sub-step being performed at the speed decoded data are required for the displaying step, according to a "decoding-on-the-fly" principle excluding any storing step of said decoded data associated to the picture elements of the predicted or interpolated macroblocks;

(3) a third decoding sub-step for performing, after the decoding operation of the later reference frame, the updating of said earlier reference frame, which is replaced by said later one.

Subject to a further increase of the internal processing complexity, such an MPEG decoding method with only one reference memory is possible whatever the type I, P or B of the pictures and, compared to the previously described MPEG decoding, it icrease an additional saving of about 1.6 Mbit in a 50 Hz environment or of about 0.8 Mbit in case of 60 Hz systems.

It is another object of the invention to provide a decoding device adapted to carry out such a method.

To this end, the invention relates to a decoding device as defined in the preamble above and also comprising:

auxiliary means for storing the decoded data corresponding only to the relevant parameters of each macroblock;

means for controlling said storing means, said bus means, and said displaying means so as to process the decoding of said coded macroblock data according to three successive sub-steps respectively provided for:

(a) decoding only the coded data corresponding to the relevant parameters of each macroblock and storing the decoded data thus obtained in said auxiliary storing means;

(b) decoding the coded data corresponding only to the picture elements and at speed at which decoded data are required by said displaying means, according to a "decoding-on-the-fly" principle and excluding any storing of said decoded data associated with the picture elements of the predicted or interpolated macroblocks;

(c) performing after the decoding operation of the later reference frame the replacement of said earlier reference frame by said later one.

BRIEF DESCRIPTION OF THE DRAWINGS

The particularities and advantages of the invention will become apparent from the following description and the accompanying drawings, given by way of non limitative examples, in which.

Figure 13:
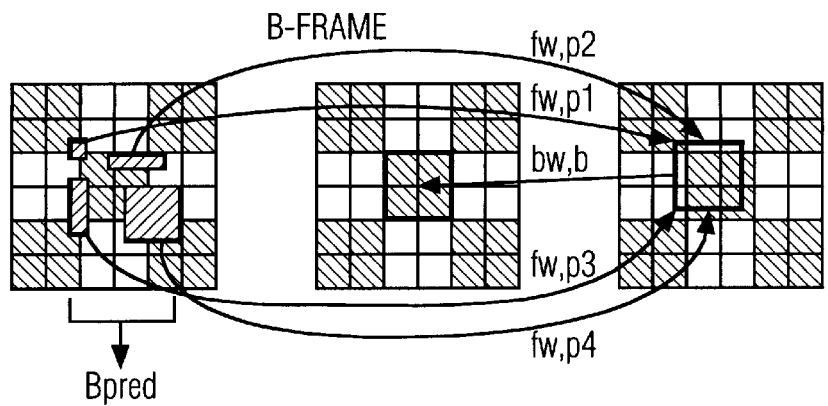
Figure 15:
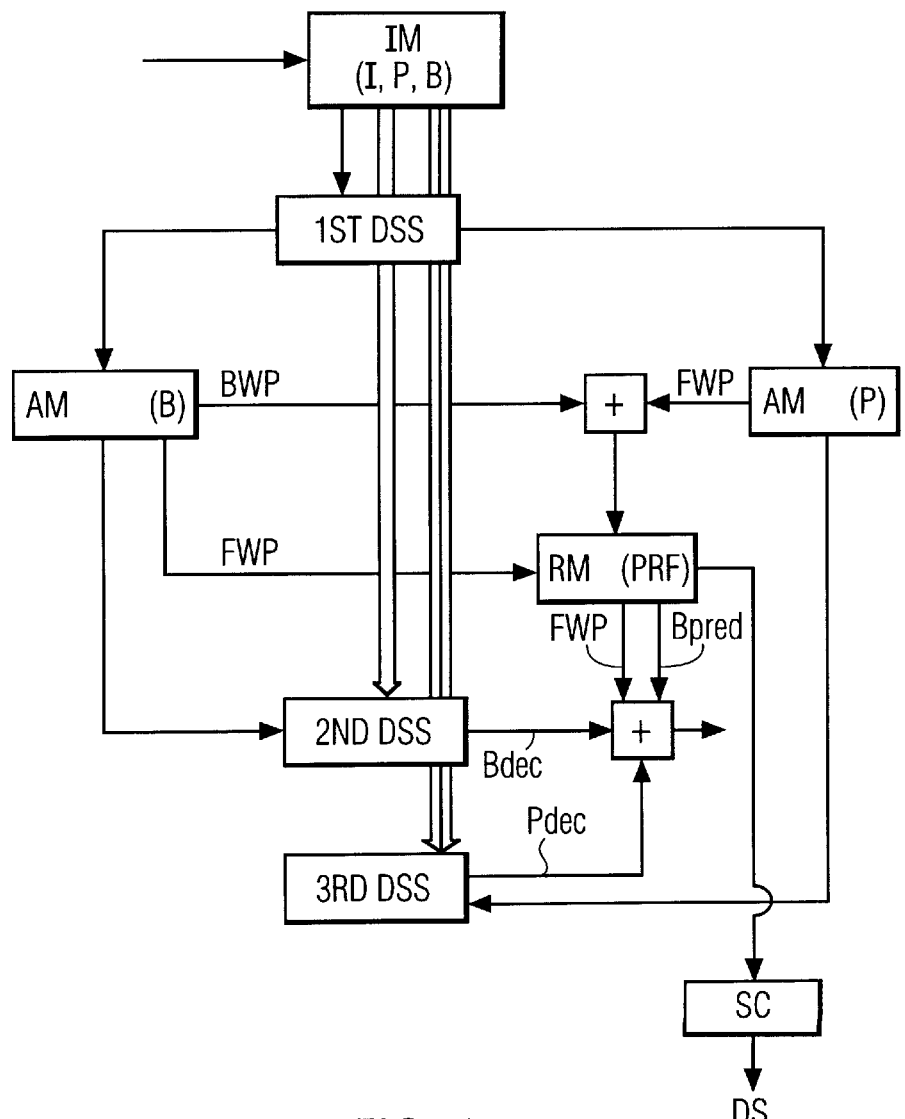
Figure 14:
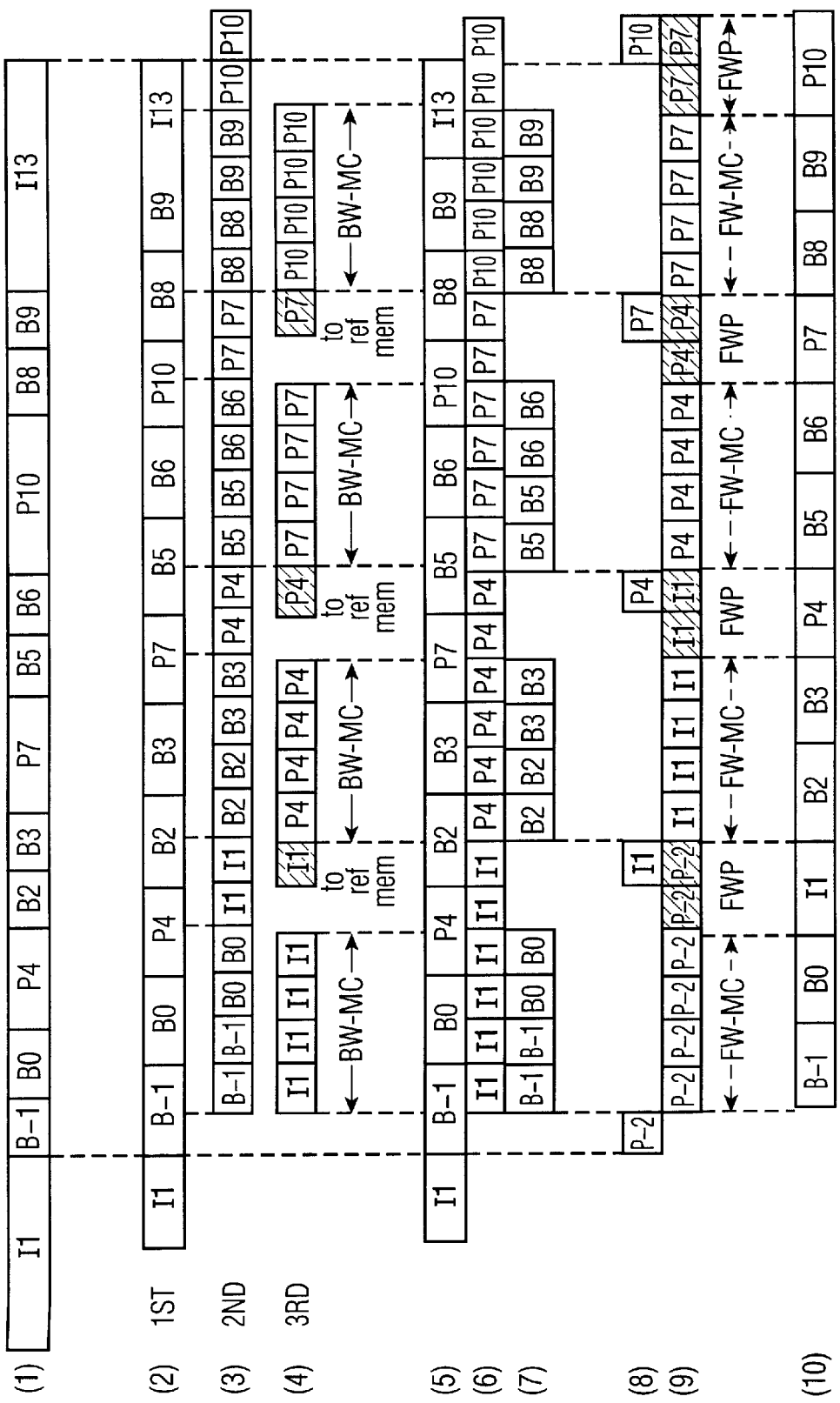

and in which:

FIGS. 11 and 12 are timing diagrams of the first and second decoding sub-steps of the decoding method according to the invention;

FIG. 13 explains the backwards motion compensation implemented according to the invention (i.e. when only the past reference frame is stored);

FIGS. 14 and 15 are recapitulative diagrams, respectively showing the temporal relation between the three decoding sub-steps according to the invention and a block diagram useful for a better understanding of the decoding principle of the bidirectionally interpolated macroblocks.

DESCRIPTION OF THE PREFERRED EMBODIMENTS

The improved decoding method of the invention, as described in reference to FIGS. 11 to 15, aims at decoding of MPEG signals with only one reference frame memory. Only the past reference frame will be stored in its fully decoded form: it is sufficient for predicted P frames, and it will be shown that also the reconstruction of bidirectionally predicted B frames can be obtained with only one reference frame.

Figure 1:
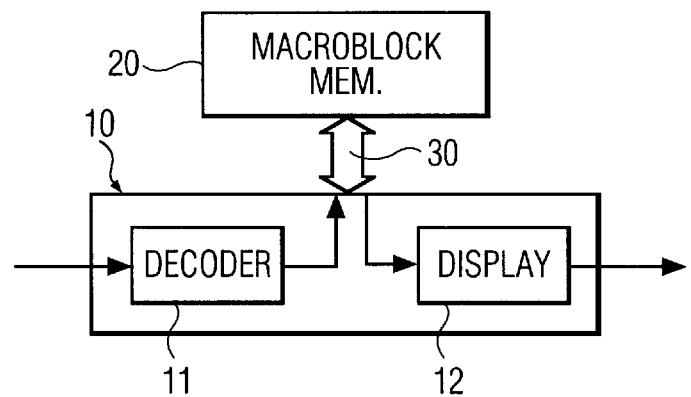
FIG. 1 shows the structure of an MPEG decoder.
Figure 2:
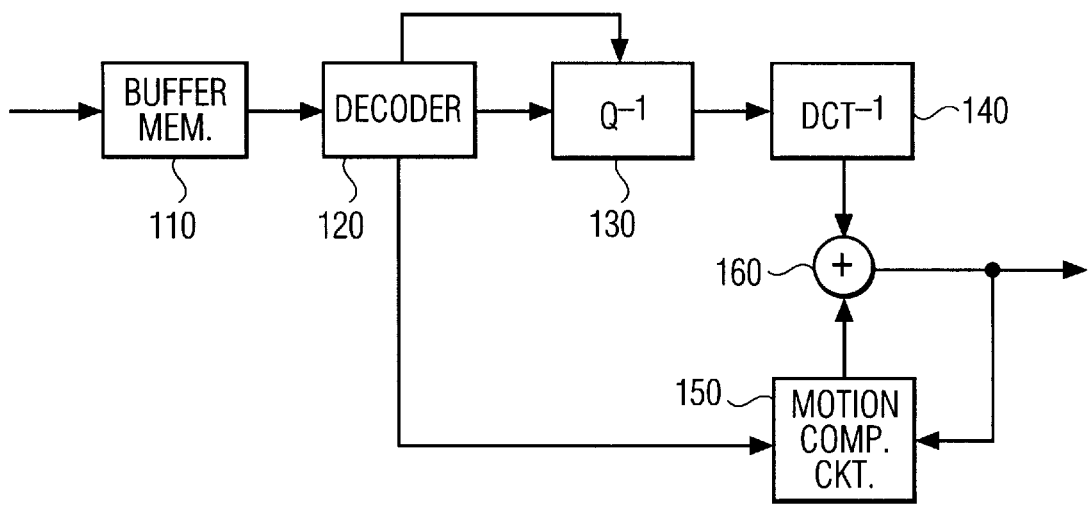
FIG. 2 shows in a more detailed manner how the decoding device of FIG. 1 is carried out according to the MPEG standard.
Figure 10:
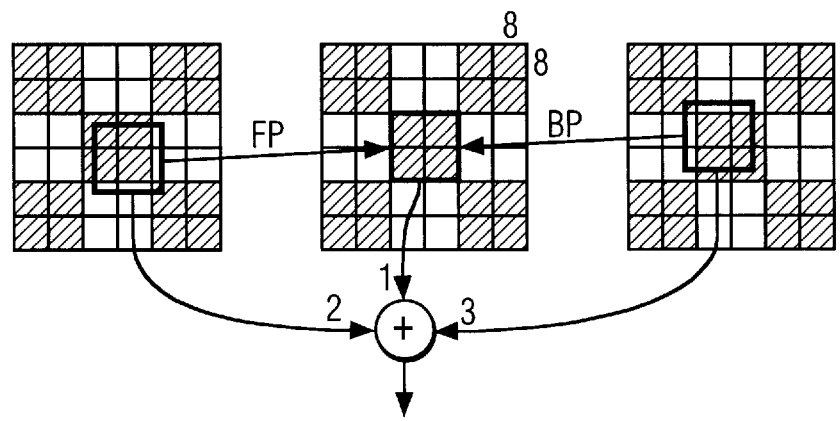
FIG. 10 shows the conventional implementation of the reconstruction of B frames.
Figures 3, 4, 5, 6, 7, 8, 9:
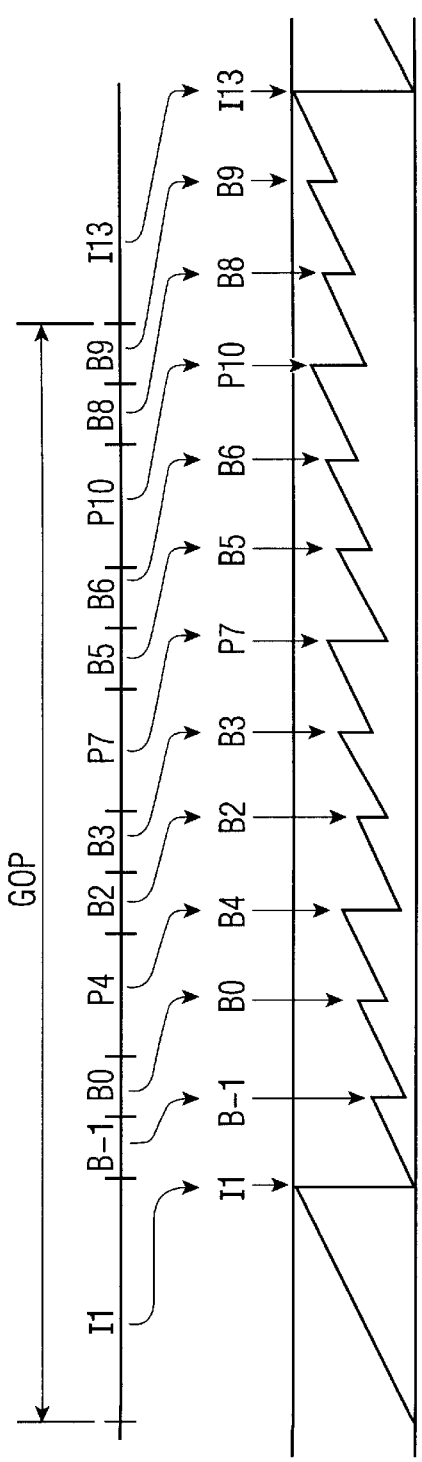
FIGS. 3 to 9 indicate the manner in which the buffer memory of an MPEG decoder is used.

FIG. 10 shows how the reconstruction of B frames is generally implemented. A part of a B frame, with blocks of 8×8 pixels, is represented in the middle of said figure, with on its left side a part of the past I (or P) frame used for the forward prediction (denoted FP) and on its right side a part of the future P frame used for the backwards prediction (denoted BP). Said reconstruction requires the decoding of the B prediction error signal, the bidirectional prediction made from these past and future reference frames, and the addition of these operations 1, 2, 3 (half the sum of the forward and backwards predictions is added to the decoded prediction error).

According to the invention, only the forward prediction will now be directly made from memory with the aid of the forward motion vectors corresponding to that B frame. Backwards prediction requiring information from the future frame which will be no longer available from memory, that frame will be reconstructed "on-the-fly". This method of decoding will now be described in detail.

The decoding method first comprises a decoding sub-step at nominal speed (i.e. at the frequency of the frames) for decoding from among the fully coded data corresponding to each macroblock only the relevant macroblock parameters (macroblock overhead and its address, quantization step size, block lengths, motion vectors per macroblock, and so on). The obtained decoded data are called auxiliary data and are stored in a part called auxiliary memory of the external memory of the decoder. This first decoding sub-step, which concerns I, P and B frames, can be better understood by reference to the time diagram of FIG. 11. This figure shows on its lines 1 and 2 successively the following information:

(1) the content of the input FIFO memory;

(2) the frames concerned affected by the reading operation within said FIFO memory and by the writing operation within said auxiliary memory (as the first decoding sub-step concerns all the frames, the relevant macroblock parameters are stored for each of them), the auxiliary data of two successive frames being kept in memory.

This first decoding sub-step is followed by a second decoding sub-step provided for performing the "on-the-fly"

decoding of the prediction error signal of the fields to be displayed. Since this prediction error signal is directly required by the display process, this decoding sub-step is aligned on that process, i.e. implemented at display speed (at the frequency of the fields) and no longer at nominal speed. Therefore all macroblocks (1620 or 1350 according to whether decoding is performed in a 50 Hz or 60 Hz environment) will be decoded per field. The second decoding sub-step, which concerns P and B frames, can be better understood by reference to the time diagram of FIG. 12. This figure shows on its lines 1 to 6 successively the following information:

(1) the content of the input FIFO memory;
(2) the frames concerned with the reading operation within said FIFO memory;
(3) the frames concerned with the reading operation within said auxiliary memory;
(4) the frames concerned with the reading operation (for the forward prediction of P frames) in the reference memory;
(5) the frames concerned with the writing operation in the reference memory for the updating of its content;
(6) for information, the frames which are displayed.

According to the concerned frames or macroblocks, one must distinguish several situations:

(a) intra coded frames and intra coded macroblocks of B frames need no further prediction: the decoding result can then directly be used for display, as indicated on line 6 of FIG. 12, showing that the frame I1 (odd and even fields) is displayed after a reading of the input FIFO memory (line 2) and of the auxiliary memory (line 3) during the same frame interval;

(b) for predictive coded frames and for predictive coded macroblock of B frames, a motion prediction from the past reference frame has still to be added to the decoding prediction error: this reference frame is supposed (as will be seen in the description of the third decoding sub-step) to be present in the memory in its fully decoded form (for instance: the predictive coded frame P4 is decoded (1.6) after a forward prediction (FWP, 1.4) using the single stored reference frame I1 and the corresponding motion vector;

(c) for each bidirectionally predicted B frame, a motion compensation using a prediction from both the past and the future reference frame has to be made, but only the forward prediction (as seen in (b)) can directly be made from reference memory with the aid of the forward vectors associated to that B frame: backwards prediction requires from the future frame an information which is not available in memory (this future frame being not stored) and has to be reconstructed "on-the-fly".

For bidirectionally interpolated macroblocks, a third decoding sub-step is then provided for performing this "on-the-fly" decoding of the future reference frame. As this future frame is not stored, only the stored reference frame will be used. The decoding of the prediction error signal as well as the forward prediction are obtained as previously indicated. On the contrary, backwards prediction is done as now indicated with reference to FIG. 13.

With the aid of the backwards B vector, it is first determined per macroblock which 16×16 area of the future P frame is required for prediction. Generally the involved area does not coincide with the macroblock border. Therefore, to obtain the decoded information in this area in the future frame, nine luminance blocks and four chrominance blocks have to be fully decoded (it is assumed that luminance blocks within one macroblock can be decoded independently, otherwise sixteen luminance blocks should be decoded: such individual decoding is possible if during the first decoding sub-step an information on the position of the still compressed macroblocks within the input buffer has been determined, i.e. if this position information has been included in the list of relevant macroblock parameters which are decoded at nominal speed during this first sub-step). After decoding, the decoded information can already be added to the decoded prediction error signal and to the result of the forward prediction both previously obtained.

The backwards prediction, which has still to be added to the result of this addition, can be done directly from the stored reference frame, provided that the proper motion vectors are used: the vectors for this prediction are obtained by summing the forward vector in the P frame and the backwards vector in the B frame. However, for this addition the type of motion of each of the involved macroblocks must be taken into account, as shown in FIG. 13: per macroblock one backwards vector of the B frame and four forward vectors of the P frame (and the motion types) are involved in this prediction process,. mainly based on a right addressing of the external memory.

It must be noted that a reference frame updating is handled by this third sub-step as soon as the backwards prediction has been done from this stored reference frame. For instance, the frame I1 is replaced by the frame P4 which becomes the new single stored reference frame. The whole third sub-step can be better understood by reference to the time diagram of recapitulative FIG. 14, which allows to compare this sub-step with the previous ones and at this end shows successively the following information on its lines 1 to 10:

(1) the content of the input FIFO memory;
(2,3,4) the frames respectively concerned by the reading operation within said input memory during the first, the second and the third decoding sub-step;
(5,6,7) the frames respectively concerned by:
  (a) the writing operation of the auxiliary data (relevant macroblock parameters) within the auxiliary memory during the first decoding sub-step (all the successive pictures of the sequence in the transmission modified order $I_1$, $B_{-1}$, $B_0$, $P_4$, $B_2$, $B_3$, $P_7$, $B_5$, $B_6, \ldots, \ldots$, are concerned by this first sub-step);
  (b) the reading operation of the auxiliary data within the auxiliary memory during the second "on-the-fly" decoding sub-step, in order to authorize (see the last line 10) the displaying operation of I1 (the odd field, and then the even field), P4 (three frame periods later), P7, and so on;
  (c) the reading operation of the auxiliary data within the auxiliary memory during the third decoding sub-step, in order to authorize, after the forward motion compensation FW-MC (see the line 9) and the "on-the-fly" decoding of the future reference frame, the backwards motion compensation BW-MC (see the line 4), done directly from the still stored past reference frame (the corresponding vector being obtained by summing the forward vectors in the P-frame—in relation with the past frame—and the backwards vector in the B frame—in relation with the future frame), and the reference frame updating;
(8) the frames concerned by said reference frame updating (i.e. by the writing operation, within the reference memory, of the frame that will allow the forward prediction of the next predicted frame and the interpolation of both next B-frames according to the third decoding sub-step;

(9) the updated reference frames, as used for the motion compensation FW-MC (in view of the interpolation of said newt B-frames) and for the forward prediction FWP (in view of the prediction of said predicted frames);

(10) the frames which are displayed (in the same order as the original one).

In addition to this recapitulative time diagram, a block diagram as shown in FIG. 15 can be useful for a better understanding of the decoding principle of the bidirectionally predicted macroblocks. The steps that appear in that figure are the following:

(a) the input coded data corresponding to encoded I, P, or B frames are stored into the input FIFO memory IM;

(b) the first decoding sub-step (1ST DSS) allows to store the relevant macroblock parameters of B frames and P frames in the auxiliary memory AM (=AM(P)+AM (B));

(c) the second decoding sub-step (2ND DSS) allows to perform the "on-the-fly" decoding of the prediction error of the fields to be displayed (Bdec for the B-frames, Pdec for the future P-frames) and the forward prediction FWP from the past reference frames PRF (stored in the reference memory RM);

(d) the third decoding sub-step (3RD DSS) allows to add the decoded prediction error Pdec and the backwards prediction Bpred (done from the stored reference frame by summing the forward vectors FWP in the P-frame and the backwards vector BWP in the B-frame) to the decoded prediction error Bdec and the forward prediction FWP, and to handle the reference memory updating (the output of the adder performing the addition of Bdec, Pdec, FPW and Bpred is sent back towards an updating input of said reference memory RM);

(e) the output of said adder is sent towards a scanning converter SC, performing before the displaying step DS a conversion from macroblocks to scanning lines.

It has therefore been described a three steps decoding method allowing an extra memory capacity saving in comparison to the previous known methods. For the implementation of this method, a decoding device according to the invention first comprises memorization means—such as a FIFO memory—for storing the input bitstream of digital signals to be decoded. Memorization means are also provided for storing the earlier reference frame. Decoding means are then activated, in order to decode the stored signals which comprise on the one hand the coded relevant parameters of each macroblock (of I, P or B type) and on the other hand the coded signals corresponding to the picture elements of each of theses macroblocks. Under the supervision of means for controlling all other parts of the decoding device and processing the decoding operation of said coded macroblock data, these decoding means carry out first the decoding sub-step of the coded data corresponding only to the relevant parameters of each macroblock, which are stored in the form of decoded auxiliary data in auxiliary means, followed by the decoding sub-step of the coded data corresponding only to the picture elements according to said "decoding-on-the-fly" principle, and finally by the updating operation (after the decoding operation of the later reference frame) of the content of the memorization means, by replacement of the earlier reference frame by the later one. Means for displaying the pictures reconstituted in accordance with the decoded data, working at the pixel frequency, are then provided for converting said decoded data into the appropriate format and sending these converted decoded data and associated video synchronisation signals on a display screen.

The invention is obviously not limited to the embodiments described hereinbefore, from which variations or improvements may be conceived without departing from the scope of the invention. It may for instance be noted that the above described decoding device, generally implemented in the form of a single chip video decoder, corresponds in its main parts to the previously described implementation, except with respect to the control and processing means which are provided to carry out the three step decoding operation and therefore are modified in comparison with any previous processor. Such control and processing means are leading a series of programmed instructions that are particularly organized in order to perform appropriate memory address generation and bus arbitration for the memory accesses, these accesses being generally organized in small bursts corresponding to the size of blocks of 8×8 picture elements.

It must also be noted that, in the described decoding device, the storing means for the input coded data, for the earlier reference frame and for the auxiliary data may be associated to form a single physical memory, controlled by said control and processing means according to the above-given indications.

I claim:

1. A method of decoding digital signals which correspond to images subdivided into fixed-size picture areas, called macroblocks, and have been transmitted and/or stored in the form of coded data corresponding either to frames of I or P type, respectively coded without using information from other frames or predicted by means of a motion-compensated prediction from an earlier reference frame and an associated motion information, or to frames of B-type, bidirectionally interpolated from an earlier and a later reference frame of I or P type and associated motion information, said decoding method comprising for the decoding operation of the macroblocks the steps of:

storing the input bitstream of the coded macroblock data of I, P or B type, corresponding for each macroblock to its relevant parameters and the picture elements;

decoding said coded data according to their type;

displaying pictures reconstituted in accordance with the decoded data thus obtained;

in which said decoding step comprises the following sub-steps:

(1) a first decoding sub-step for decoding among the coded macroblock data only the relevant macroblock parameters, the decoded signals thus obtained being stored as auxiliary data;

(2) a second decoding sub-step for decoding among said coded macroblock data only the data corresponding to the picture elements, said second sub-step being performed at the speed decoded data are required for the displaying step, according to a "decoding-on-the-fly" principle excluding any storing step of said decoded data associated to the picture elements of the predicted or interpolated macroblocks;

(3) a third decoding sub-step for performing, after the decoding operation of the later reference frame, the updating of said earlier reference frame, which is replaced by said later one.

2. A device for decoding digital signals which correspond to images subdivided into fixed-size picture areas, called macroblocks, and have been transmitted and/or stored in the form of coded data corresponding either to frames of I or P type, respectively coded without using any information from other frames or predicted by means of a motion-compensated prediction from an earlier reference frame and an associated motion information, or to frames of B type, bidirectionally interpolated from an earlier and a later reference frame of I or P type and associated motion information, said decoding device comprising:

- input memory means for storing the input bitstream of the coded macroblock data of I, P, or B type;
- means for decoding said coded macroblock data according to said type;
- reference memory means for storing at least said earlier reference frame;
- means for displaying after a format conversion the pictures reconstituted in accordance with the decoded data thus obtained; and
- bus means for connecting said input memory means, said decoding means and said displaying means;

said device also comprising:

- auxiliary memory means for storing the decoded data corresponding only to the relevant parameters of each macroblock;
- means for controlling said auxiliary memory means, said bus means, and said displaying means so as to process the decoding of said coded macroblock data according to the following three successive sub-steps:
  - (a) decoding the coded data corresponding only to the relevant parameters of each macroblock and storing the decoded data thus obtained in said auxiliary memory means;
  - (b) decoding the coded data corresponding only to picture elements and at a speed at which decoded data are required by said displaying means, according to a "decoding-on-the-fly" principle excluding any storing of the decoded data associated with picture elements of predicted or interpolated macroblocks; and
  - (c) performing after decoding of the later reference frame the replacement of said earlier reference frame by said later one.

3. A decoding device according to claim 2, wherein said input memory means for the input coded data, said memory means for the earlier reference frame and said auxiliary storing means for the decoded data corresponding to the relevant macroblock parameters are associated to form a single physical memory controlled by said control and processing means.

* * * * *